April 4, 1944. N. V. SMITH 2,345,837
VALVE MECHANISM
Filed Oct. 7, 1942 2 Sheets-Sheet 1
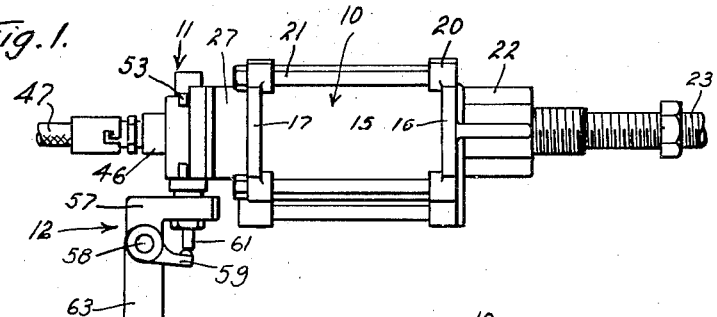
Fig. 1.
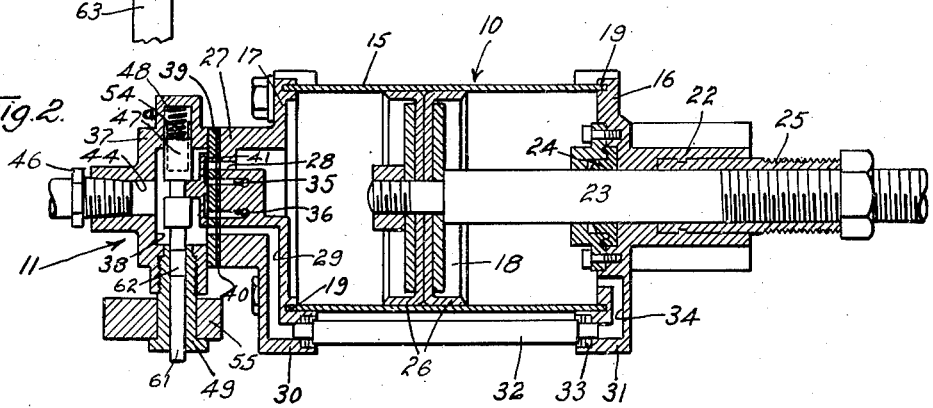
Fig. 2.
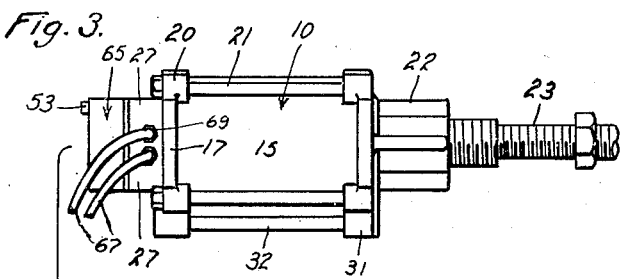
Fig. 3.
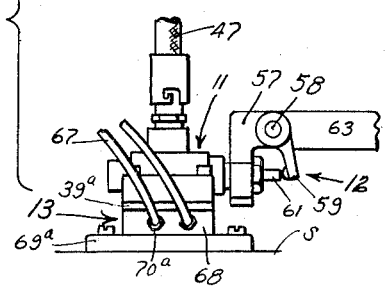
Inventor
Neil V. Smith
by *[signature]*
Attorney April 4, 1944.   N. V. SMITH   2,345,837
VALVE MECHANISM
Filed Oct. 7, 1942   2 Sheets-Sheet 2
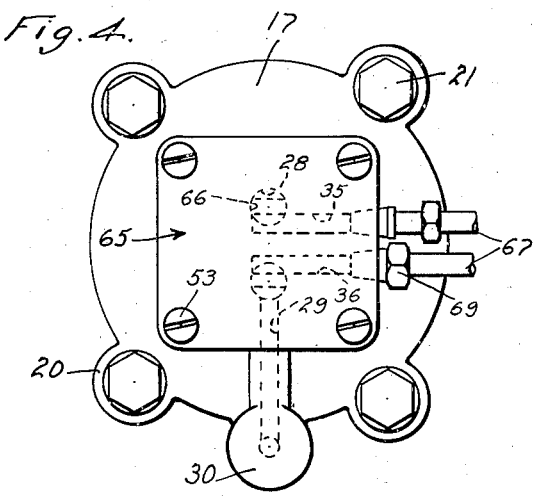
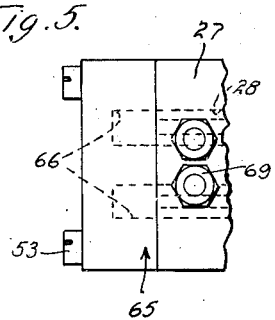
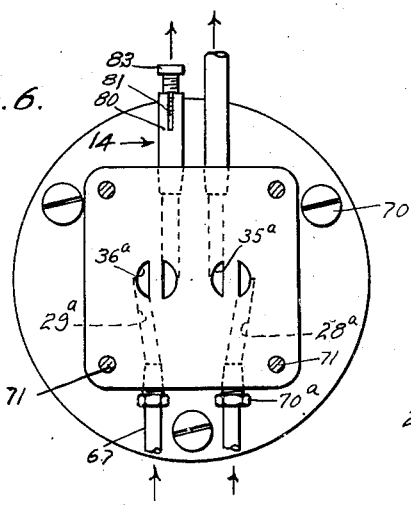
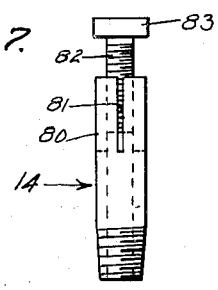
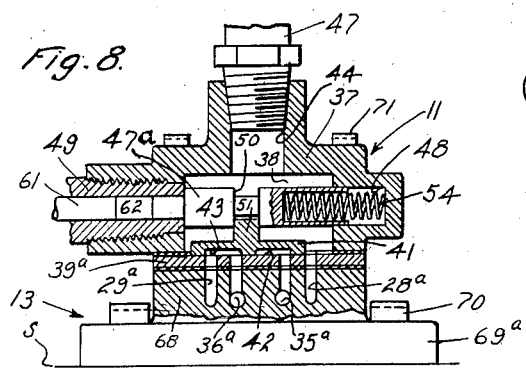
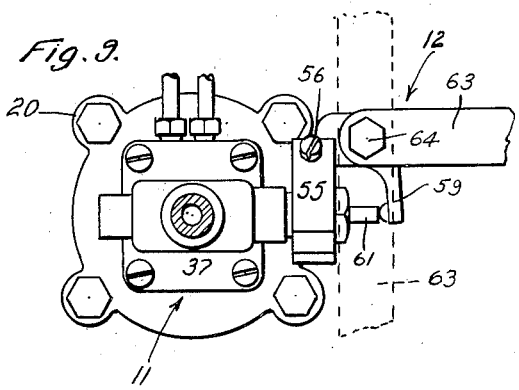
Inventor
Neil V. Smith
by
Attorney Patented Apr. 4, 1944

2,345,837

UNITED STATES PATENT OFFICE 2,345,837

VALVE MECHANISM

Neil V. Smith, Los Angeles, Calif., assignor, by mesne assignments, to Senacon Service Company, Cleveland, Ohio, a partnership Application October 7, 1942, Serial No. 461,111

3 Claims. (Cl. 121—38)

This invention relates to valves and relates more particularly to valve mechanisms for reciprocating air motors and the like. A general object of this invention is to provide an effective compact and inexpensive motor valve mechanism that may be arranged or mounted in practically any location as operating or installation conditions may require.

Another object of this invention is to provide a valve means for a double acting reciprocating air motor or the like that may be secured to a cylinder head of the motor or that may be positioned at a selected or required point remote from the motor.

Another object of this invention is to provide a motor valve means of the character mentioned whose position or location may be changed at will or may be determined at the time of installation without modifying or altering the valve construction or the motor cylinder construction.

Another object of this invention is to provide a valve mechanism of the character referred to that embodies a simple ported adaptor block that is secured to the motor cylinder head in substitution for the valve and a simple mounting base for the valve means that may be located or positioned at any point remote from the motor and which mounts or carries the valve means for operation.

Another object of this invention is to provide a valve means of the character referred to that includes an adjustable operating means that may be set or adjusted to receive the valve actuating force from practically any direction and which is mounted on the valve means to form a part thereof so that it may be moved with the valve means when the latter is mounted or secured in the selected position.

Another and important object of this invention is to provide a valve mechanism of the character referred to providing a separate exhaust port for each end of the motor cylinder, which ports may be independently controlled to govern motor operation.

A further object of this invention is to provide a novel control means for the exhaust ports of the valve mechanism that may be regulated or set to provide for piston movement at the required or selected speed in either, or both, direction of piston movement.

A further object of the invention is to provide a valve means of the character referred to in which the normal position setting of the motor may be readily changed or reversed by turning the valve chest 180° when the valve means is mounted on the cylinder head or is mounted at the selected remote point.

The various objects and features of my invention will be fully understood from the following detailed description of a typical preferred form and application of my invention, throughout which description reference is made to the accompanying drawings, in which:

Fig. 1 is a side elevation of a reciprocating air motor equipped with the valve mechanism of the invention showing the same on a cylinder head of a motor. Fig. 2 is an enlarged longitudinal detailed sectional view of the motor and valve mechanism illustrated in Fig. 1. Fig. 3 is a view similar to Fig. 1 showing the adaptor block on the cylinder head of the motor and illustrating the valve mechanism mounted at a remote point. Fig. 4 is an enlarged end view of the assembly showing the adaptor block on the cylinder head. Fig. 5 is a side elevation of the adaptor block showing a portion of the cylinder head. Fig. 6 is a vertical detailed sectional view showing the valve plate mounted on the mounting base and illustrating one of the regulable exhaust controlling devices. Fig. 7 is an enlarged side elevation of one of the exhaust control units removed from the other parts. Fig. 8 is a longitudinal detailed sectional view of the valve mechanism on its remote mounting means and Fig. 9 is an enlarged end view of the valve means mounted on the cylinder head illustrating the adjustable valve operating means.

The mechanism of the present invention may be said to comprise, generally, a cylinder and piston means 10, valve means 11 adapted to be mounted on the cylinder and piston means 10 to control the operation thereof, adjustable operating means 12 for the valve means 11, an adaptor plate 65 to be mounted on the means 10 when the valve means is to be mounted at a remote point, interconnecting pipes or tubes 67 for extending from the adaptor plate 65 to the valve at the remote point, means 13 for mounting the valve means 11 at a point remote from the cylinder and piston means 10, and regulable means 14 for controlling the exhaust from the cylinder and piston means 10.

The cylinder and piston means 10 is in the nature of a double acting reciprocating air motor. The means 10 comprises a cylinder 15, heads 16 and 17 for the ends of the cylinder 15 and a piston 18 operable in the cylinder. The cylinder 15 may be a simple tubular part whose ends are received and sealed in grooves 19 in the heads 16 and 17. Spaced lugs 20 are provided on the peripheries of the heads 16 and 17 and screws or bolts 21 are passed through openings on the lugs 20 on one head and are threaded into openings in the lugs on the other head to clamp the heads 16 and 17 onto the ends of the cylinder 15. The front head 16 has an outwardly projecting central boss 22. The piston rod 23 passes through an opening in the boss 22 and sealing means 24 is provided on the head 16 to seal about the rod. The cylinder heads 16 and 17 may be die cast, in which case a steel mounting tube 25 is embedded or cast in the boss 22 to project from the end thereof. The projecting portion of the tube 25 is screw threaded and either the boss 22, the tube 25, or both, may be employed to facilitate the mounting of the motor. The piston 18 is double ended having oppositely facing sealing members 26 for slidably sealing with the wall of the cylinder 15.

The rear cylinder head 17 is adapted to mount or carry the valve means 11 and is ported to conduct the fluid pressure to and from the ends of the cylinder 15. A central boss 27 projects from the outer side of the head 17. The boss 27 may be rectangular or square and has a flat outer face. Two pairs of ports are provided in the head 17 and its boss 27. A cylinder port 28 passes through the boss 27 and the head 17 to communicate with the rear end of the cylinder 15. A similar port 29 passes through the boss 27 and head 17 to a lug 30 on the periphery of the head. The other cylinder head 16 has a similar lug 31 and a tube 32 extends between the two lugs 30 and 31 and its ends are sealed therein by sealing means 33. A port 34 in the front head 16 leads from the end of the tube 32 in the lug 31 to the forward end of the cylinder 15. It will be seen how the port 29 has communication with the front end of the cylinder 15 through the medium of the tube 32 and the port 34. The cylinder ports 28 and 29 extend to the flat outer end of the boss 27 and are preferably spaced a substantial distance apart. There is a companion exhaust port 35 for the cylinder port 28 and a companion exhaust port 36 for the cylinder port 29. The exhaust ports 35 and 36 have their ends spaced from and adjacent their respective cylinder ports 28 and 29 at the flat outer face of the boss 27 and the exhaust ports lead to one of the side faces of the boss 27 where they may discharge into the atmosphere, may be provided with exhaust pipes, or may be equipped with the exhaust control units 14, as will be more fully described.

The valve means 11 includes a chest 37 adapted to be mounted on the boss 27 and adapted to be carried by the remote mounting means 13. The valve means 11 is a compact self-contained unit that may readily be mounted on the cylinder head boss 27 in either one of two positions, or that may be arranged on the means 13 at any required or selected remote point as installation and operating conditions may require. The chest 37 carries and contains the various other elements of the valve means 11 and is a simple part whose inner portion is square or rectangular to conform to the external configuration of the boss 27. The chest 37 has a flat inner face or mounting face and the chest is hollow having a valve chamber 38 which extends to the flat inner face of the chest. The face of the die cast cylinder head boss 27 is preferably provided with a finished steel plate 39. Sealing gaskets 40 are provided between the faces of the plate 39 and the surfaces of the boss 27 and chest 37. The outermost gasket 40 is cut out at the chamber 38 to expose the surface of the plate 39 at the chamber. The plate 39 has openings registering with the ports 28, 29, 35 and 36, which openings pass through the plate and form parts or extensions of the ports. The chest 37 is adapted to receive the fluid or air under pressure for operating the motor. In the construction illustrated, the outer side of the chest 37 has an inlet port 44 surrounded by a boss 45 which receives the fitting or hose coupling 46. The air supply conduit or hose 47 extends from the coupling 46.

The valve means 11 further includes a valve 41 in the chamber 38 slidably bearing on the exposed face of the plate 39. The valve 41 is adapted to control the pairs of ports 28 and 35 and 29 and 36. The inner side or active side of the valve 41 has two spaced cavities or recesses 42 and 43, see Fig. 8. The recess 42 is adapted to communicate with the adjacent ports 28 and 35 to connect the same when the valve 41 is in one position and the recess 43 is adapted to connect the ports 29 and 36 when the valve 41 is in its other position. This last named position is illustrated in Fig. 8 of the drawings where it will be seen that the recess 43 puts the two ports 29$^a$ and 36$^a$ in communication with one another at a time when the recess 42 only has communication with the exhaust port 35$^a$ leaving the cylinder port 28$^a$ open to the interior of the chamber 38. In a like manner, when the recess 42 is in communication with its two ports 28 and 35 the recess 43 only communicates with the exhaust port 36 leaving the port 29 open to the interior of the chamber 38. This position is illustrated in Fig. 2. It will be seen that with the valve 41 in the position first described above, operating fluid pressure is supplied to the rear end of the cylinder 15, while the front end of the cylinder is open to the atmosphere through the port 34, tube 32, port 29, recess 43 and port 36. On the other hand, when the valve 41 is in the position illustrated in Fig. 2 of the drawings, operating fluid pressure is supplied to the front end of the cylinder 15, while the rear end of the cylinder is open to the atmosphere through the port 28, recess 42 and port 35.

A stem 47$^a$ is provided in the chamber 38 to shift the valve 41. One side wall of the chest 37 has a cavity or socket 48 slidably receiving a tubular end portion of the stem 47$^a$. A tubular adaptor or bushing 49 is screw threaded in an opening in the opposite wall of the chest 37 and a reduced end portion of the stem 47$^a$ is slidably received in the bushing. It will be seen how the stem 47$^a$ is effectively guided for movement in the chamber 38. The stem 47$^a$ is operatively connected with the valve 41. An annular groove 50 is provided in the stem 47$^a$ at a point between its ends and the valve 41 has an outstanding knob or projection 51 received or engaged in the groove 50.

The valve means 11, just described, is removably secured on the cylinder head 17 by screws 53 arranged through openings in the corner portions of the chest 37 and threaded into openings in the boss 27. The screws 53 are symmetrically disposed, being arranged in a square. With this construction the valve chest 37 may be mounted on the boss 27 in either of two positions. In one position of the valve means 11 the actuating fluid pressure or air pressure is normally supplied to the forward end of the cylinder 15, while in the other position of the valve means the actuating air pressure is normally delivered to the rear end of the cylinder. Means may be incorporated in the valve means 11 to urge the valve 41 to its "normal" position just described. This means may consist of a spring 54 engaged under compression in the recess or socket 48 and the tubular portion of the valve stem 47a to urge the valve 41 in one direction. With the chest 37 in the position or relationship illustrated in the drawings, the spring 54 urges the valve 41 to the position where its recess 43 connects the ports 29 and 36 to permit the free exhaust of air from the front end of the cylinder 15 and where the port 28 is open to the chamber 38 to provide for the delivery of air under pressure to the rear end of the cylinder so that the piston rod 23 is extended or projected.

The means 12 for operating the valve means 11 is such that various forms of operating linkages, pedals, handles, etc., may be utilized to operate the valve means 11 and is such that the actuating force may be applied from various directions. The means 12 includes a split collar 55 turnably mounted on the projecting portion of the bushing 49. The collar 55 may be turned to any selected position and then clamped in place by a screw 56. The collar 55 has an outwardly projecting ear or lug 57 which carries a freely turnable shaft 58. A lever or tappet 59 is fixed to the shaft 58 and is adapted to operate the valve 41. A push rod 61 is slidable in the bushing 49 and projects from its outer end. The tappet 59 is adapted to shift the push rod 61 inwardly to shift the valve 41. A sealing unit 62 of wood, fibrous material, or the like, is engaged in the bushing 49 between the rod 61 and the valve stem 47a. An operating lever 63 for the shaft 58 is engaged on the shaft and a screw 64 is threaded into the end of the shaft 58 to clamp the lever 63 against the hub of the tappet 59. By loosening the screw 64 the lever 63 may be turned or adjusted to project in any selected or desired direction. When the screw 64 is again tightened the lever 63 is secured in the selected relation or position. It will be seen that upon loosening the screw 56 the collar 55 may be adjusted around the longitudinal axis of the push rod 61 to move the lug 57 and the operating lever 63 to any position and the lever 63 may be adjusted on the shaft 58, as just described, to project in any selected direction. These two adjustments give the valve operating means an almost universal adjustability and allows the valve means to be operated when in practically any location. It will be observe that the adjustable operating means 12 is mounted on the valve means 11 to be shifted and mounted therewith.

Features of the motor 10, valve means 11 and operating means 12 are described and claimed in my co-pending application Serial No. 429,757, filed February 6, 1942.

The adaptor plate 65 is to be mounted on the boss 27 of the cylinder head 17 when the valve means 11 is to be carried by the remote mounting means 13. The plate 65 may be a simple block-like element having a flat inner face for conforming to the end of the boss 27 and being rectangular or square in end view to conform with the square boss. The adaptor plate 65 may be secured on the boss 27 by the above mentioned screws 53 which pass through openings in the corner portions of the adaptor plate. The adaptor plate 65 has two spaced sockets or cavities 66 in its inner face for registering with the cylinder ports and exhaust ports of the boss 27. The one socket 66 joins or connects the ports 28 and 35 and the other socket 66 connects the ports 29 and 36. Thus the exhaust ports 35 and 36 of the boss 27 are transfer ports or extensions of the ports 28 and 29 when the adaptor plate 65 is mounted on the cylinder head 17. It will be noted that the adaptor plate 65 is a simple part readily attached to the boss 27 in place of the valve mechanism 11.

The means 13 for mounting the valve means 11 at the selected remote point is an important feature of the invention. The means 13 is such that the valve means 11 may be mounted on the cylinder head 17, as above described, or the self same valve means may be arranged at any selected remote point, for example, in a position remote from the cylinder and piston mechanism 10 where it is conveniently accessible for manual operation.

A transfer pipe or tube 67 leads from each port 35 and 36, to a mounting plate or base plate 68 for the valve mechanism 11. Suitable fittings or couplings 69 may be threaded in the outer ends of the ports 35 and 36 to receive and hold the tubes 67. In practice the tubes 67 may be light, flexible tubes that may be easily shaped or bent to extend to any required point. The base plate 68 may be secured to any available or desired support at the point where the valve means 11 is to be arranged. In the case illustrated in Figs. 3 and 8 of the drawings, the base plate 68 has a mounting flange 69a secured to a horizontal support S by screws 70, or the equivalent. The base plate 68 has a flat upper side. In practice the base plate 68 may be a die casting, or the like, and its upper side may be equipped with a plate 39a. The plate 39a may be a finished steel plate and, in practice, may be identical with the plate 39 described above. When the valve means 11 is moved from the motor to a remote point the plate 39 may be moved with it. Therefore, the plate 39a may be the same plate as described above. The base plate 68 has two cylinder ports 28a and 29a corresponding to the ports 28 and 29, respectively, of the boss 27. The tubes 67 extend from the ports 35 and 36 of the boss 27 to the outer ends of the ports 28a and 29a. The ports 28a and 29a may have their outer ends at a side of the mounting plate 68 and may be equipped with threaded fittings or couplings 70a to receive the tubes 67. Exhaust ports 35a and 36a are provided in spaced companion relation to the ports 28a and 29a, respectively. The ports 28a and 35a and 29a and 36a extend through the plate 39a to have their ends at the outer side of the plate. The outer ends of the pairs of ports 28a and 35a and 29a and 36a are in the same relation and have the same spacing as the outer ends of the ports 28 and 35 and 29 and 36 of the boss 27. The exhaust ports 35a and 36a lead to a side of the base plate 68. In practice the outer ends of the ports 35a and 36a may occur in a side of the base plate 68 opposite to the fittings 70a. The ports 35a and 36a may discharge into the atmosphere or may be controlled by the means 14 to be subsequently described.

The valve means 11 is adapted to be mounted on the base plate 68. The valve chest 37 is arranged on the plate 39a and gaskets are provided between the surfaces of the plate 39a and the surfaces of the base plate 68 and the chest 37. The outer gasket is cut away to leave the finished face of the plate 39 exposed to form the inner wall of the chamber 38. The valve chest 37 may be secured on the base plate 68 by screws 71 passed through the corner openings in the chest and threaded into openings in the base plate.

The valve means 11 remains as described above and when mounted as just described its valve 41 cooperates with the face of the plate 39a to control the pairs of ports 28a and 35a and 29a and 36a. From the above description it will be seen that the adaptor plate 65, the tubes 67 and the ports 28a and 29a, in effect, constitute extensions or continuations of the ports 28 and 29, respectively, and it will be seen that the exhaust ports 35a and 36a occupy the same relationship to the outer ends of the ports 28a and 29a as the exhaust ports 35 and 36, respectively. The valve 41 is adapted to operate as above described to control the two pairs of ports 28a and 35a and 29a and 36a to govern the admission and discharge of the operating air under pressure to and from the opposite ends of the cylinder 15. The air pressure supply hose 47 is connected with the chest 37 as above described to deliver the operating fluid pressure to the chamber 38 so that such pressure may be supplied to the ports 28a and 29a when the same are uncovered and open to the chamber. With the valve 41 in the position illustrated in Fig. 8 of the drawings air under pressure is supplied to the port 28a and is thus supplied to the rear end of the cylinder 15 while the recess 43 connecting the ports 29a and 36a provides for the escape or exhaust of fluid pressure from the forward end of the cylinder 15. When the valve 41 is in its other position the port 29a is open to the chamber 38 and the operating fluid pressure passes to the front end of the cylinder 15, while the recess 42 connects the ports 28a and 35a so that the air under pressure is free to exhaust from the rear end of the cylinder. It is to be understood that the valve chest 37 may be turned 180° from the position illustrated so that the "normal setting" or condition of the motor will be reversed, that is, so that air under pressure will be "normally" supplied to the front end of the cylinder 15 instead of the rear end of the cylinder. The same result may be produced by merely crossing the pipes or tubes 67.

The means 14 is operable to restrict the exhaust of the air under pressure from the cylinder 15 to control the rate of piston movement. The means 14 may be utilized to control or retard piston movement in either direction or in both directions as operating conditions may require and, in accordance with the invention, the means 14 is regulable so that there may be any selected or necessary retardation of piston movement. It is a feature of the invention that the means 14 may include two units, one for controlling each of the exhaust ports and that each of these units is individually regulable irrespective of the setting of the other. Furthermore, the invention contemplates that these units of the means 14 may be employed when the valve means 11 is mounted on the cylinder head 17, as illustrated in Figs. 1 and 2 of the drawings, and that they may be used when the valve means 11 is mounted on the base plate 68, as illustrated in Figs. 3, 6 and 8.

Fig. 7 of the drawings illustrates one of the units of the means 14. This unit includes an elongate body or tube externally screw threaded at one end and internally screw threaded at the other end. The externally threaded end of the body 80 is adapted to be screwed into the outer end of an exhaust port 35 or 36 or 35a or 36a. In the drawings the body 80 is shown threaded into the outer end of the exhaust port 36a, see Fig. 6. It is to be understood that when it is desired to control the speed of piston movement in both directions a unit of the means 14 is provided for each exhaust port 28 and 29 or 28a and 29a and the disclosure in Fig. 6 is not to be construed as limiting the invention to the employment of only one unit of the means 14.

The outer end portion of the body 80, which is internally screw threaded, has one or more longitudinal slots 81 entering it from its extremity. In the case illustrated, there are four equally spaced slots 81 in the outer portion of the body 80. A regulating screw 82 is threaded into the slotted outer portion of the body 80. The screw 82 is longer than the slots 81 and when fully threaded into the body 80 may extend inwardly beyond the slots 81. This would in effect completely close off the exhaust of air through the port 36a. By threading the screw 81 outwardly the inner end of the screw is brought to a position outwardly from the inner ends of the slots 81, thus uncovering portions of the slots for the exhaust of the air pressure. By threading the screw 92 in or out the aggregate amount of opening provided by the several slots 81 may be accurately varied or adjusted to permit greater or less freedom of discharge of the exhaust air under pressure. The outer end of the screw 82 is provided with a head 83 to facilitate its ready adjustment. It is believed that it will be understood how a unit of the means 14 may be readily installed in either one of the exhaust ports 35 or 36 or 35a or 36a, as the case may be, or in both of the exhaust ports, and how they may be adjusted by means of the screws 82 to provide for any required or desired control of the piston movement in one direction, or both directions, as the case may be.

It is to be observed that the action of the motor may be varied or changed at will by employing valve plates 39 or 39a having ports of different shapes and in different spaced relations, or by employing a valve 41 having recesses 42 and 43 of different shapes and relative spacings. It is an inherent feature of the mechanism that the shape and relative positions of the valve ports in the plate 39 or 39a and of the recesses 42 and 43 in the valve 41 govern the movement of the piston 18 and the position of the piston for any given movement and position of the valve 41. The ability to vary the motor action by changing the valve elements, coupled with the ability to govern piston speed in either direction by easy adjustment of the means 14 materially extends the range of utility and application of the motor and provide for the rapid adaptation of the motor to any given use.

Having described a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In a power unit, a cylinder and piston mechanism, means with two pairs of ports one pair for each end of the cylinder and each pair including a port leading to one end of the cylinder and an exhaust port, a plate attached to the mechanism and having cavities connecting the two ports of each pair together, a base plate at a point remote from the cylinder and piston mechanism having cylinder ports and having an exhaust port spaced from each cylinder port, conduits connecting the cylinder ports with the exhaust ports of the cylinder and piston mechanism, a source of actuating fluid pressure, a valve chest mounted on the base plate and having communication with said source of pressure, and a valve movable in the chest operable to put either one of said cylinder ports in communication with its respective exhaust port while placing the other cylinder port in communication with said chest and source.

2. In a power unit, a cylinder and piston mechanism, means with two pairs of ports, one for each end of the cylinder and each having a port leading to the cylinder and having an exhaust port, a plate attached to the mechanism and having two cavities one for each pair of ports connecting the two ports thereof, a base plate at a point remote from the cylinder and piston mechanism having cylinder ports and having an exhaust port spaced from each cylinder port, conduits connecting the cylinder ports with the exhaust ports of the cylinder and piston mechanism, a source of actuating fluid pressure, a valve chest mounted on the base plate and having communication with said source of pressure, a valve movable in the chest operable to put either one of said cylinder ports in communication with its respective exhaust port while placing the other cylinder port in communication with said chest and source, and means for moving the valve including operating lever means mounted on the chest.

3. In a power unit, a cylinder and piston mechanism, means having two pairs of ports, one for each end of the cylinder and each including a port to the cylinder and an exhaust port, means attached to the mechanism for connecting the two ports of each pair together, a base plate at a point remote from the cylinder and piston mechanism having cylinder ports and having an exhaust port spaced from each cylinder port, conduits connecting the cylinder ports with said connected ports of said pairs of ports, a source of actuating fluid pressure, a valve chest mounted on the base plate and having communication with said source of pressure, a valve movable in the chest operable to put either one of said cylinder ports in communication with its respective exhaust port while placing the other cylinder port in communication with said chest and source, and means at at least one of the exhaust ports for regulating the discharge of fluid pressure therefrom to retard piston movement.

NEIL V. SMITH.